United States Patent [19]

McFadden

[11] 4,438,910

[45] Mar. 27, 1984

[54] SHOCK ABSORBING SNUBBER FOR DERRICK HOOKS

[75] Inventor: Edward J. McFadden, Houston, Tex.

[73] Assignee: Hughes Tool Company, Houston, Tex.

[21] Appl. No.: 405,230

[22] Filed: Aug. 5, 1982

Related U.S. Application Data

[63] Continuation of Ser. No. 184,607, Sep. 5, 1980, abandoned.

[51] Int. Cl.³ .............................................. F16F 9/19
[52] U.S. Cl. .................................... 267/126; 188/282
[58] Field of Search ....................... 188/282, 314, 317; 267/118, 124, 126, 127, 137

[56] References Cited

U.S. PATENT DOCUMENTS

| 2,500,459 | 3/1950 | Hoover et al. | 267/127 |
| 3,444,965 | 5/1969 | Dobkins | 188/282 |

Primary Examiner—Duane A. Reger
Attorney, Agent, or Firm—Robert A. Felsman; Charles D. Gunter, Jr.

[57] ABSTRACT

An improved shock absorbing snubber for derrick hooks is shown which includes a stationary hydraulic plunger and a telescoping barrel arrangement. A spring loaded check valve mounted on the plunger allows generally free fluid flow as the barrel is moved in one direction relative to the plunger but restricts the flow of fluid as the barrel is moved in the opposite direction.

2 Claims, 5 Drawing Figures

SHOCK ABSORBING SNUBBER FOR DERRICK HOOKS

This is a continuation of application, Ser. No. 06/184,607, filed Sept. 5, 1980, now abandoned.

BACKGROUND OF THE INVENTION

This invention relates generally to derrick hooks used on rotary earth drilling rigs and, more particularly, to an improved shock absorbing snubber of the type used to dampen the vertical movement of the hook shank.

Rotary earth drilling rigs used for drilling oil and gas wells utilize a traveling block and hook arrangement for tripping stands of pipe into and out of the well bore. When raising the pipe stand, an elevator assembly is positioned around the box end of the pipe held by slips in the rotary table. A pair of steel links connect the elevator assembly to the derrick hook. The derrick hook and associated traveling block are hoisted along the vertical axis of the drilling rig by cable linkages.

Pipe strings at times extend thousands of feet into the earth requiring derrick hooks of massive size. Prior art hooks typically have a shank which is free to move up and down within an outer housing. A helical coil spring is positioned around the shank in the hook housing. A spring seat is connected to the upper end of the shank and engages the coil spring. Downward vertical movement of the shank, such as occurs when a load is applied to the hook, compresses the spring.

In raising a stand of pipe from the well bore, the slips are released and the weight of the pipe string causes the hook shank to move downward along the vertical axis of the housing. This action compresses the coil spring positioned about the shank. When the pipe stand has been raised to the proper position, the slips are again engaged at the rotary and the pipe is unscrewed. As the threaded tool joint connection is unscrewed, the coil spring in the derrick hook exerts an upward force on the pipe stand. This upward force assists in unscrewing the connection and in raising the stand of pipe high enough to allow it to be moved sidewise into the racking area.

In order to prevent the pipe from bouncing or "jumping out" as the spring tension is relieved, a shock absorbing unit or "snubber" is utilized to dampen the vertical movement of the hook shank. By dampening the vertical travel of the shank, a controlled rate of return is achieved which prevents damage to the threaded tool joint connections.

In certain prior art embodiments, the snubber unit is physically connected to the hook shank. One such snubber assembly uses a stationary plunger and a barrel that slides telescopingly over the plunger. The barrel is secured to the top of the shank. The plunger and barrel contain hydraulic fluid. An orifice in the bottom of the plunger restricts fluid flow between the barrel and plunger, dampening both upward and downward movement of the shank. This design is difficult to service since it is necessary to disassemble the entire hook in order to service the snubber. Also, application of a sudden load to the hook shank is transferred directly to the snubber assembly since the barrel is secured to the top of the shank.

Other prior art snubbers are self-contained units not physically connected to the hook shank. One such design includes a piston located in a chamber in which hydraulic fluid exerts continuous hydrostatic pressure against the cylinder walls. The piston is biased downwardly and has a check valve that allows free fluid flow past the piston when moving downwardly. When moved upwardly, only restricted flow past the piston is allowed. Upward movement of the shank pushes the piston upwardly, dampening shank movement only in the upward direction, as desired. The continuous pressure, however, in the chamber results in some leakage problems around the piston shaft.

SUMMARY OF THE INVENTION

It is accordingly an object of this invention to provide an improved snubber assembly which is easier to maintain and has an improved service life.

Another object of this invention is to provide an improved snubber assembly which is a self-contained unit but which is not subjected to continuous fluid pressure in the static state.

The improved snubber of the present invention includes a stationary hydraulic plunger having a closed upper end mounted in the hook housing and cylindrical sidewalls. A sliding barrel having a closed bottom and open top fits telescopingly over the plunger in concentric fashion. A check valve including a spring biased plate is mounted on the lower end of the plunger. The check valve allows generally free flow of fluid when the barrel moves downward relative to the plunger, but restricts fluid flow upon upward movement of the barrel. The barrel is urged downwardly by a spring. Upward travel of the shank forces the barrel upwardly, resulting in dampening.

BRIEF DESCRIPTION OF THE DRAWINGS

FIG. 2a is a detailed view of the spring loaded exhaust valve.

DETAILED DESCRIPTION OF THE INVENTION

Figure 1:
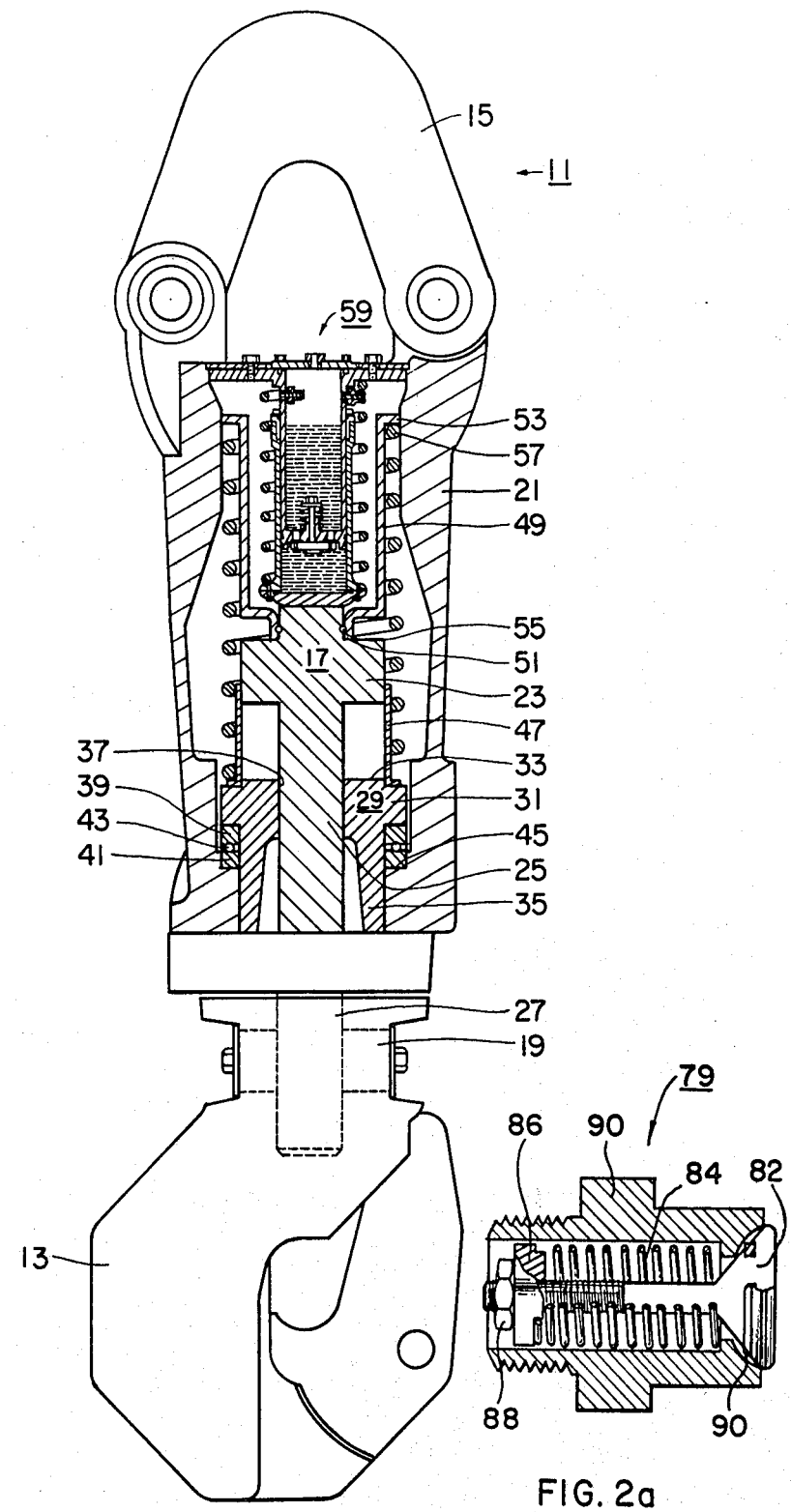
FIG. 1 is a partially sectioned side view of a derrick hook constructed in accordance with this invention.

Referring now to FIG. 1, there is shown a derrick hook designated generally as 11. Derrick hook 11 includes a hook body 13 which engages the elevator-like assembly (not shown) used to raise and lower pipe into and out of the well bore. A bail 15 is provided on the upper end of hook 11 for connection to the derrick traveling block. A shank 17 is connected to the hook body 13 by means of a pin 19. Shank 17 is mounted within a hook housing 21 for movement along and rotation about the vertical axis thereof. Shank 17 is polygonal in cross section and has an upper flanged end 23, an intermediate region 25, and lower end 27.

A swivel ring 29 having a flared upper end 31, a transverse upper surface 33 and generally cylindrical lower section 35, is mounted coaxially with the shank 17 in the hook housing 21. Swivel ring 29 has a polygonal opening 37 adapted to receive the intermediate region 25 of shank 17, so that rotation of the shank 17 causes corresponding rotation of the swivel ring 29. Flared upper end 31 of swivel ring 29 rides on a bearing unit including upper race 39, lower race 41, and plurality of balls 43. Lower race 41 is received by circumferential ledge 45 in housing 21.

An annular spring guide 47 rests on the upper transverse surface 33 of swivel ring 29. The internal diameter of spring guide 47 is selected to allow the upper flanged end 23 of shank 17 to slide inside the spring guide 47 as shank 17 moves along the vertical axis of the hook housing 21.

An annular spring seat 49 having a bottom end 51 and flared end 53 is connected to the upper flanged end 23 of shank 17 by a plurality of balls 55 in a common race. The flared end 53 of spring seat 49 engages a helical coil spring 57 positioned about shank 17 in hook housing 21, so that downward vertical movement of the shank 17 compresses the spring 57. The axial spring force exerted by spring 57 on spring guide 47 maintains the position of spring guide 47 on swivel ring 29.

Figure 2:
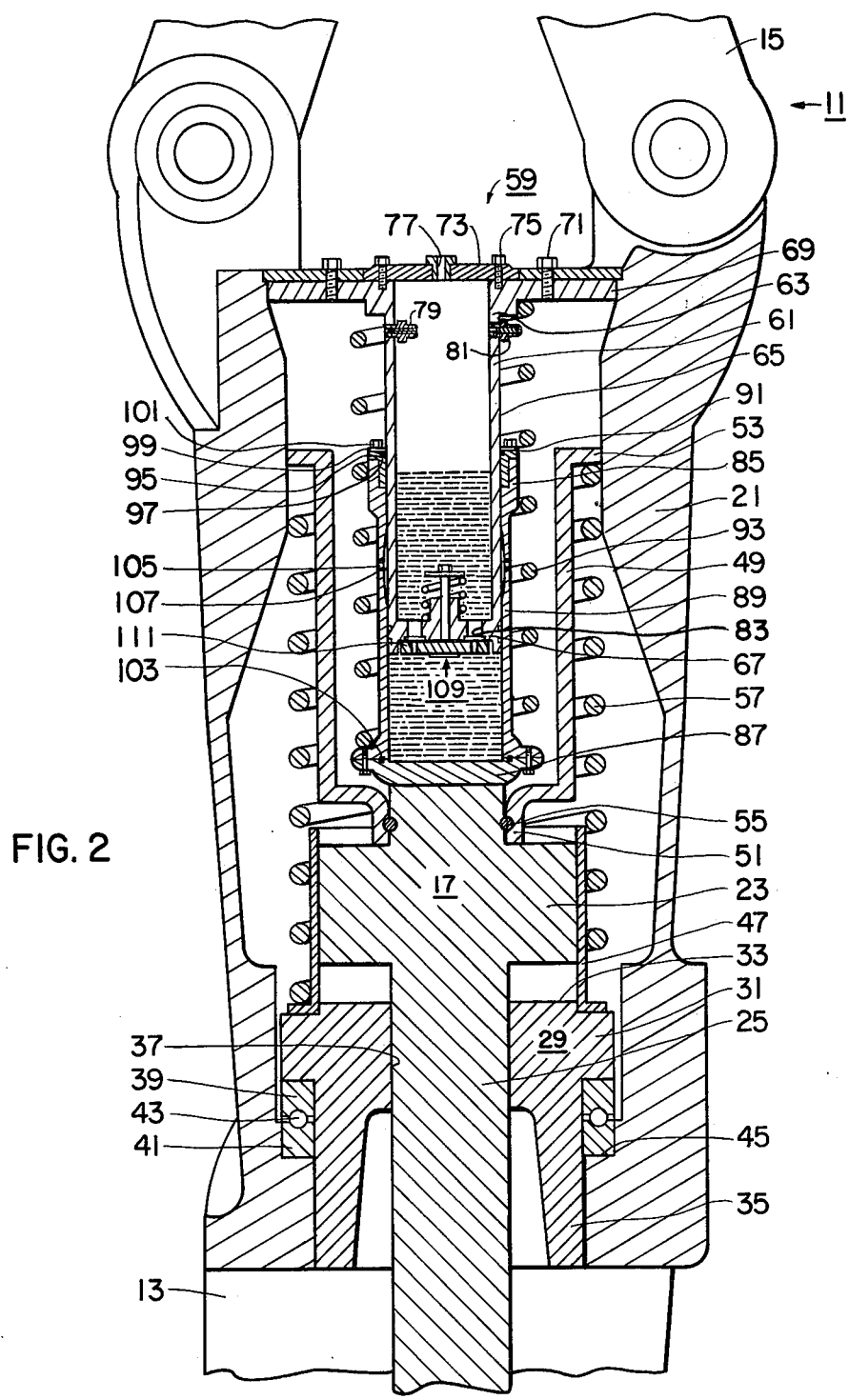
FIG. 2 is an enlarged view of the upper portion of the derrick hook of FIG. 1, partially in section.

The snubber assembly denoted generally as 59 in FIG. 1 is shown in greater detail in FIG. 2. Snubber assembly 59 includes a stationary hydraulic plunger 61 having a closed mounting end 63, cylindrical sidewalls 65, and a lower end 67. Mounting end 63 includes a lip 69 which is secured to hook housing 21 as by bolts 71. Mounting end 63 of plunger 61 is sealed by means of a cover 73 and bolts 75. A fill port 77 is provided with a lock screw. The lower end 67 of plunger 61 is provided with a plurality of orifices 83 to allow fluid flow into and out of the interior of plunger 61.

Low pressure spring loaded exhaust valves 79,81 are positioned in mounting end 63 for serving as air passage means to allow air displacement. An exhaust valve 79 is shown in detail in FIG. 2a. The other exhaust valve 81 is identical, but is oriented in the opposite direction. Thus, one exhaust valve 79 allows air to flow into the snubber assembly 59, and the other exhaust valve 81 allows air to flow out of the snubber assembly 59. These valves 79,81, which are commercially available, have a spring biased poppet 82 moveable between a seated position to restrict air flow and an unseated position for allowing air flow. A compression spring 84 seats at one end against a spring seat 86, which is held in place by a washer 88 on the end of the poppet 82. The opposite end of the spring 84 seats against a shoulder 90 on the valve housing 92.

A sliding barrel 85 having a closed bottom 87 of resilient material, cylindrical sidewalls 89 and an open top 91 is adapted to receive the lower end 67 of plunger 61 in telescopingly, concentric fashion. The internal diameter of barrel 85 is selected to allow the inner sidewalls 89 of barrel 85 to slidingly engage the external sidewalls 65 of plunger 61. The lower end 67 serves as a partition, dividing the interiors of the plunger 61 and barrel 85 into a lower chamber and an upward chamber. A helical coil spring 93 is positioned about snubber assembly 59 with one end seated about the closed bottom 87 of barrel 85 and the opposite end seated against the underside of lip 69 of hydraulic plunger 61. Thus in the position shown in FIG. 2, spring 93 exerts a downward force on barrel 85 causing the lower end 87 to contact upper flanged end 23 of shank 17.

In order to assure a tight fluid seal, the open end 91 of barrel 85 is provided with an annular soft metal wear bushing 95 having a groove 97 cut to receive a urethane rod wiper. A retainer plate 99 fastens bushing 95 to the open end 91 of barrel 85 as by bolts 101. The lower end 87 of barrel 85 has an "o"-ring seal 103 at the interface of the lower end 87 with the sidewalls 89 to contain fluid in the interior of the barrel. Vent holes 105 are drilled in the sidewalls 89 to allow air displacement in an annular space 107 between the barrel 85 and plunger 61.

Figure 3:
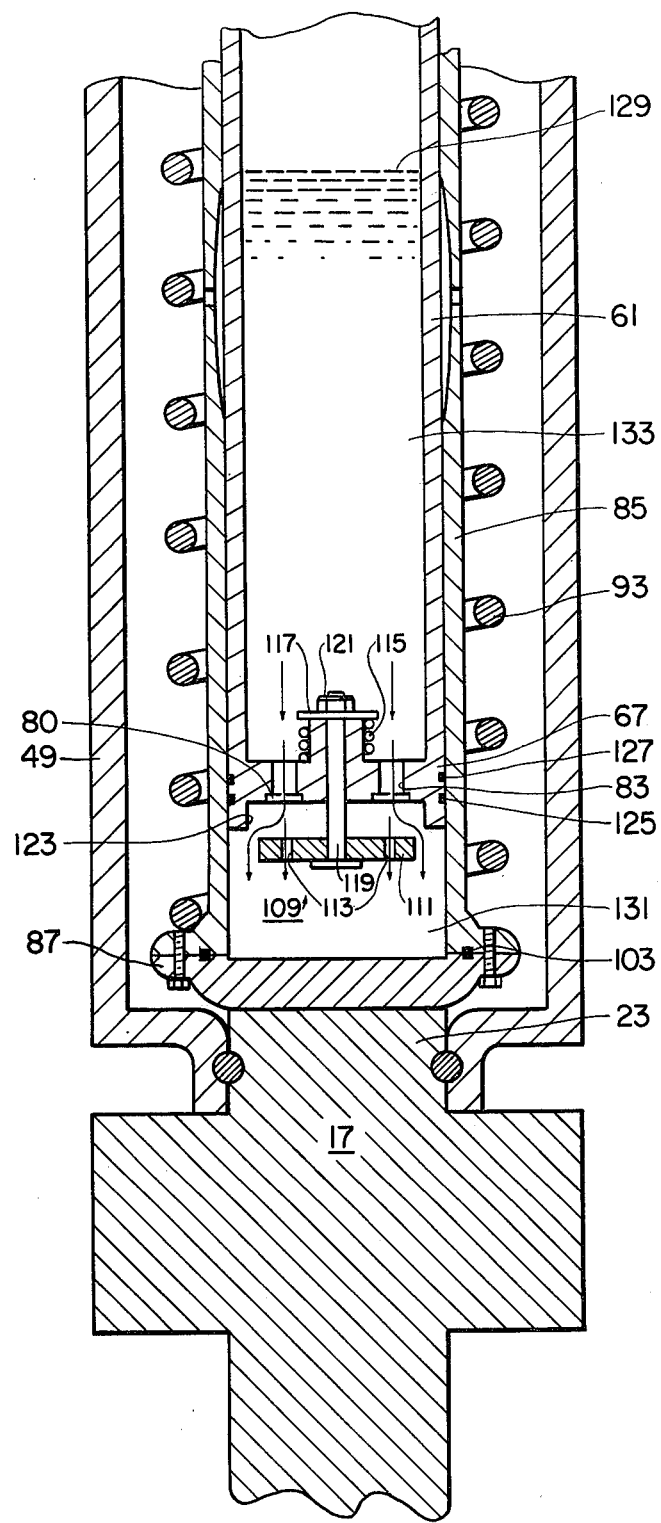
FIG. 3 is a sectional enlarged view of a portion of the derrick hook of FIG. 1, illustrating the operation of the snubber as a load is applied to the hook shank.
Figure 4:
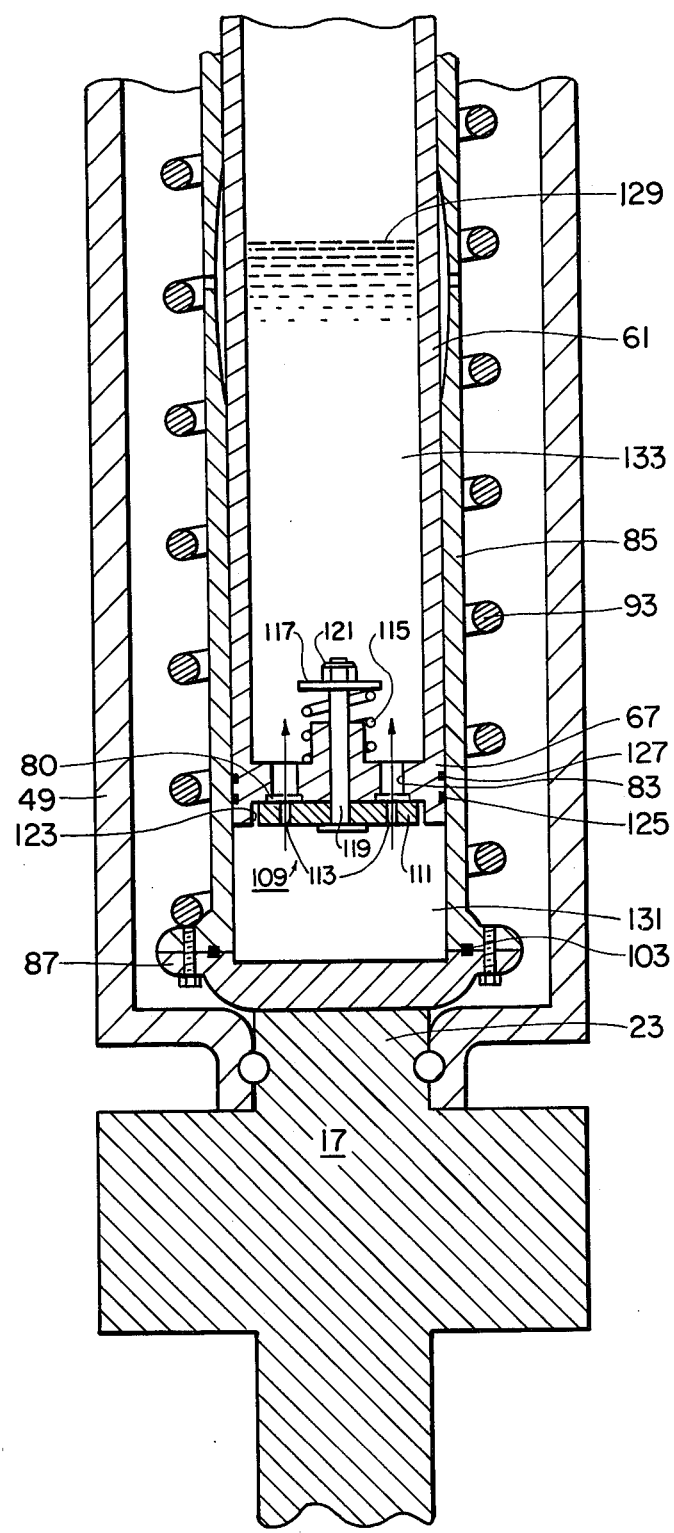
FIG. 4 is a sectional enlarged view of a portion of the derrick hook of FIG. 1, similar to FIG. 3 and showing the operation of the snubber as load is removed from the hook shank.

A check valve 109 is provided on the lower end 67 of plunger 61. Referring to FIGS. 3 and 4, check valve 109 includes a spring biased plate 111 moveable between a seated position to restrict fluid flow and an unseated position for greater relative fluid flow. Spring biased plate 111 is circular in shape and has a plurality of holes 113, each hole 113 in approximate vertical alignment with one of the orifices 83 in the lower end 67 of plunger 61. The diameter of orifices 83 is at least twice the diameter of mating holes 113, thus the total cross-sectional area of the orifices 83 is greater than the total cross-sectional area of the holes 113. In addition, a circumferential groove 80 cut in the exterior surface of lower end 67 connects the orifices 83 to provide for fluid flow in the event that holes 113 in plate 111 are not in perfect alignment with the orifices 83 in plunger 61.

Plate 111 and lower end 67 are drilled to receive a bolt or shaft 119 which is held in place by washer 117 and nut 121. A compression spring 115 seats at one end against the interior of lower end 67 and at the opposite end against washer 117. The exterior surface of lower end 67 has a recess 123 of slightly larger internal diameter than the external diameter of plate 111 when plate 111 is seated.

Circumferential grooves 125 and 127 are cut in the exterior sidewalls of lower end 67. Groove 125 contains a packing seal to prevent fluid loss. Groove 127 is fitted with a wear ring to lessen metal to metal contact between the sidewalls of the plunger and barrel. In the preferred embodiment, the external diameter of plunger 61 decreases gradually from the mounting end 63 to the lower end 67 while the internal diameter of the barrel 85 gradually decreases from the open top 91 to the closed bottom 87. In this manner, the packing groove 125 will easily pass within the bushing 95 of barrel 85 to facilitate assembly or disassembly of the unit.

The operation of the improved snubber can best be understood by reference to FIGS. 3 and 4. In FIG. 3, the snubber unit has been filled approximately half full with substantially incompressible hydraulic fluid 129 through fill port 77. The hydraulic fluid volume should be less than the total volume of the plunger 61 and barrel 85 when the barrel is in its uppermost position. As a load is applied to shank 17, the shank begins to move vertically downward in housing 21. As upper end 23 of shank 17 moves downward, spring 93 forces barrel 85 to slide down stationary plunger 61. As barrel 85 moves downward, a partial vacuum is created in lower chamber 131. Hydraulic fluid flows from upper chamber 133 into lower chamber 131 to fill the increased volume. Fluid flows downward through orifices 83 and holes 113. Fluid pressure overcomes the resistance of spring 115, thereby unseating plate 111 and allowing generally free flow of fluid around plate 111 and into the lower chamber 131.

In FIG. 4, the load has been removed from hook shank 17 causing it to spring upward and contact closed bottom 87 of barrel 85. As the closed bottom 87 is driven upward, the volume of hydraulic fluid in lower chamber 131 is compressed, forcing fluid against plate 111 and seating plate 111 in recess 123 in the lower end of plunger 61. The only available fluid passageway is through the relatively small diameter holes 113 in plate 111, restricting fluid flow back into upper chamber 133.

By restricting the upward travel of the hook shank, a controlled rate of return is achieved. The internal diameter of the holes 113 can be varied to vary the rate of return of the barrel relative to the plunger. Preferably the internal diameter of the holes 113 is selected so that the internal diameter of the orifices 83 are at least twice as great as the hole diameters at the point at which plate 111 contacts plunger 61. Since there is insufficient fluid to fill both the lower chamber 131 and upper chamber 133, upper chamber 133 will always be only partially full. Lower chamber 131 will be always full except for the momentary drawing of vacuum when the barrel 85 starts downward. The upper chamber 133 is of fixed volume and the lower chamber 131 varies in volume with barrel 85 movement. Air moves in and out of ports 79, 81 in upper chamber 133 in response to hydraulic fluid volume changes in the upper chamber, and to keep the upper chamber pressure substantially ambient.

It should be apparent from the foregoing that an invention has been provided with significant advantages. The improved snubber assembly is subjected to fluid pressure only in the dynamic state when the hook shank is moving vertically upward and exerting a force on the barrel. As a result, there is less chance of seal leakage and the need for frequent maintenance than in a snubber having fluid pressure in a static condition. The improved snubber allows relatively free movement of the barrel downward with respect to the plunger, and restricts only the return movement. The snubber assembly is a self contained unit which can be removed to be serviced without disassembling the hook. Since the snubber is not physically connected to the shank, a sudden load applied to the shank does not place undue stress on the snubber.

While the invention has been shown in only one of its forms, it should be apparent to those skilled in the art that it is not so limited but is susceptible to various changes and modifications without departing from the spirit thereof.

I claim:

1. A shock absorbing snubber for a derrick hook of the type having a housing, a shank axially movable in the housing, and a load bearing hook connected to the lower end of the shank, comprising:

a plunger carried by the housing, having a hollow interior and a lower end;

a sliding barrel having a closed bottom adapted to be contacted by the upper end of the shank, and an open top telescopingly receiving the lower end of the plunger;

the barrel and plunger containing hydraulic fluid with a volume less than the volume of the interiors of the barrel and the plunger when the shank has pushed the barrel to an uppermost position;

check valve means mounted in the interior of the plunger for restricting fluid flow rate from the barrel to the plunger upon movement of the barrel upward relative to the plunger, and for allowing an increased rate of fluid flow from the plunger to the barrel upon movement of the barrel downward relative to the plunger; and air passage means in the top of the plunger communicating with the atmosphere for allowing air to pass in and out of the plunger above the hydraulic fluid in response to hydraulic fluid volume changes to maintain the pressure in the plunger substantially at ambient.

2. A shock absorbing snubber for a derrick hook of the type having a housing, a shank axially movable in the housing, and a load bearing hook connected to the lower end of the shank, comprising:

a plunger carried by the housing, having a hollow interior and a lower end;

a sliding barrel having a closed bottom adapted to be contacted by the upper end of the shank, and a open top telescopingly receiving the lower end of the plunger;

the barrel and plunger containing hydraulic fluid with a volume less than the volume of the interiors of the barrel and the plunger when the shank has pushed the barrel to an uppermost position;

check valve means mounted in the plunger for allowing generally free flow of fluid from the plunger to the barrel when the barrel moves downwardly, and restricting the flow of fluid from the barrel to the plunger when the barrel is pushed upwardly by the shank; and low pressure spring loaded exhaust valves in the top of the plunger communicating with the atmosphere for allowing air to pass in and out of the plunger above the hydraulic fluid in response to hydraulic fluid volume changes to maintain the pressure in the plunger substantially at ambient.

* * * * *